(12) United States Patent
Jung et al.

(10) Patent No.: US 10,772,137 B2
(45) Date of Patent: Sep. 8, 2020

(54) INTERNET OF THINGS GATEWAY AND OPERATING METHOD OF THE SAME

(71) Applicant: Grib Co., Ltd, Seoul (KR)

(72) Inventors: Yeon Kyu Jung, Goyang-si (KR); Jae Ho Yoo, Seoul (KR); Seung Wook Choi, Seoul (KR); Sung Hoon Kim, Seoul (KR)

(73) Assignee: Grib Co., Ltd, Seoul (KR)

( * ) Notice: Subject to any disclaimer, the term of this patent is extended or adjusted under 35 U.S.C. 154(b) by 0 days.

(21) Appl. No.: 15/876,738

(22) Filed: Jan. 22, 2018

(65) Prior Publication Data
US 2018/0220476 A1    Aug. 2, 2018

(30) Foreign Application Priority Data

Jan. 31, 2017   (KR) .................. 10-2017-0014016

(51) Int. Cl.
*H04W 76/11* (2018.01)
*H04L 12/66* (2006.01)
(Continued)

(52) U.S. Cl.
CPC ......... *H04W 76/11* (2018.02); *H04L 12/2869* (2013.01); *H04L 12/66* (2013.01);
(Continued)

(58) Field of Classification Search
CPC ...... H04W 84/18–22; H04W 88/08–16; H04L 12/66
See application file for complete search history.

(56) References Cited

U.S. PATENT DOCUMENTS

2014/0362841 A1   12/2014   Shibata
2015/0029333 A1   1/2015    Ko et al.
(Continued)

FOREIGN PATENT DOCUMENTS

CN    103517385 A    1/2014
CN    103686674 A    3/2014
(Continued)

OTHER PUBLICATIONS

Notice of Allowance issued by the Korean Intellectual Property Office for corresponding Korean Patent Application No. 10-2017-0014016, dated Mar. 30, 2017.
(Continued)

*Primary Examiner* — Marcus Smith
(74) *Attorney, Agent, or Firm* — Studebaker & Brackett PC (57) ABSTRACT

Provided is an Internet of things (IoT) gateway to which it is possible to input access information for accessing a router without an additional input device and display device. The IoT gateway includes a wide area network (WAN) port monitoring portion; an operating mode determiner configured to determine an operating mode; a smart device access portion; a router access portion; and a service provider configured to, when the router access portion accesses the target router, transfer status messages acquired from one or more IoT devices to the target router, or receive control commands for the one or more IoT devices from the target router and transfer the control commands to the corresponding IoT devices.

13 Claims, 4 Drawing Sheets

(51) Int. Cl.
- *H04W 12/00* (2009.01)
- *H04L 12/28* (2006.01)
- *H04W 84/10* (2009.01)
- *H04W 12/06* (2009.01)
- *H04W 88/16* (2009.01)
- *H04W 84/12* (2009.01)

(52) U.S. Cl.
CPC ....... *H04W 12/0023* (2019.01); *H04W 12/06* (2013.01); *H04W 84/10* (2013.01); *H04W 88/16* (2013.01); *H04W 12/00516* (2019.01); *H04W 84/12* (2013.01)

(56) References Cited

U.S. PATENT DOCUMENTS

| | | |
|---|---|---|
| 2016/0323786 A1 | 11/2016 | Syed et al. |
| 2017/0063605 A1* | 3/2017 | Cheng ................ H04L 41/0668 |
| 2017/0227965 A1* | 8/2017 | Decenzo ............... H04L 67/025 |
| 2017/0353859 A1* | 12/2017 | Idnani ................... H04W 12/08 |
| 2018/0034655 A1* | 2/2018 | Christopher .......... H04L 12/283 |
| 2018/0083796 A1 | 3/2018 | Suyama et al. |
| 2018/0167392 A1 | 6/2018 | Zakaria |
| 2018/0184464 A1* | 6/2018 | Fang ....................... H04L 12/66 |

FOREIGN PATENT DOCUMENTS

| | | |
|---|---|---|
| CN | 104363636 A | 2/2015 |
| CN | 105652676 A | 6/2016 |
| JP | 2014225857 A | 12/2014 |
| JP | 2014241487 A | 12/2014 |
| JP | 2016192637 A | 11/2016 |
| JP | 2017011665 A | 1/2017 |
| KR | 10-2013-0041688 A | 4/2013 |
| KR | 10-2013-0081754 A | 7/2013 |
| KR | 10-2013-0107968 A | 10/2013 |
| KR | 10-2016-0016541 A | 2/2016 |
| KR | 10-2016-0117061 A | 10/2016 |
| WO | 2016/161027 A1 | 10/2016 |

OTHER PUBLICATIONS

Notice of Preliminary Rejection issued by the Korean Intellectual Property Office for corresponding Korean Patent Application No. 10-2017-0014016, dated Mar. 6, 2017.

An Office Action mailed by the Japanese Patent Office dated Feb. 5, 2019, which corresponds to Japanese Patent Application No. 2018-012399 and is related to U.S. Appl. No. 15/876,738; with English translation.

An Office Action mailed by China National Intellectual Property Administration dated Apr. 7, 2020, which corresponds to Chinese Patent Application No. 201810072563.X and is related to U.S. Appl. No. 15/876,738 with English language translation.

\* cited by examiner

INTERNET OF THINGS GATEWAY AND OPERATING METHOD OF THE SAME

CROSS-REFERENCE TO RELATED APPLICATION

This application claims priority from Korean Patent Application No. 10-2017-0014016 filed on Jan. 31, 2017 in the Korean Intellectual Property Office, the disclosure of which is incorporated herein by reference in its entirety.

BACKGROUND

1. Field of the Disclosure

The present disclosure relates to an Internet of things (IoT) technology, and more particularly, to an IoT gateway and an operating method of the same.

2. Description of the Related Art

As it has become possible to connect to the Internet through various smart devices such as a smart phone, a smart pad, a smart sensor, a smart television (TV), and a smart car, smart devices are getting bound up with real life. For this reason, it is expected that the number of smart devices owned by each person will further increase compared to the current number of smart devices owned by each person, and about 25 billion devices will be connected based on the wireless Internet.

Due to the development of smart devices, recently, research is intensively being conducted on the IoT, such as machine to machine (M2M) communication, IoT communication, intuitive Internet of things (I2oT) communication, web of things (WoT) communication, and the like. In the IoT, sensors are connected to an external network through a network system, and sensing results of the sensors are processed and managed in real time. The final aim of the IoT is to implement an environment in which it is possible to communicate anywhere and anytime, regardless of network, device, and service, by giving computing and communication functions to all things.

Such an IoT service requires a router and a gateway for connecting various IoT devices to a network.

However, most gateways for providing an IoT service are manufactured in the form of a dongle and directly connected to a router that is a network device. In other words, gateways have limitations on their installation environments. For this reason, connection to various kinds of IoT devices (e.g., a refrigerator, a TV, an electric rice cooker, an air conditioner, a washing machine, lighting fixtures, a tablet personal computer (PC), etc.) in a house or a specific space is limited, and it is difficult to provide a broad IoT service.

To overcome the disadvantage of direct connection between a router and a gateway, it is possible to connect a gateway to a router in a wireless manner such as wireless fidelity (WiFi). However, to connect a gateway to a router in a wireless manner, it is necessary for the gateway to additionally have an input device or a display device for inputting or displaying a service set identification (SSID) and a password of the router. Therefore, the size and manufacturing cost of the gateway increase.

Also, when an existing gateway attempts to wirelessly access a router using WiFi and the SSID of the router is in Korean, the gateway may not accurately display the Korean SSID of the router, and it may be difficult to identify the router. For this reason, it is not possible to access the router that the gateway attempts to access.

Further, when there are a plurality of accessible routers, an existing gateway has no choice but to arrange the routers in alphabetical order of their SSID rather than in order of their signal strength. Therefore, it is difficult to select a router with a high signal strength.

In addition, since an existing gateway is manufactured to support only a single communication protocol, it is difficult to connect the gateway to IoT devices that use various kinds of communication protocols.

SUMMARY

Aspects of the present disclosure provide an Internet of things (IoT) gateway to which it is possible to input access information for a router without an additional input device or display device, and an operating method of the IoT gateway.

Aspects of the present disclosure also provide an IoT gateway that can accurately provide a Korean service set identification (SSID) of a router, and an operating method of the IoT gateway.

Aspects of the present disclosure also provide an IoT gateway that can rearrange and provide a list of accessible routers in order of signal strength, and an operating method of the IoT gateway.

Aspects of the present disclosure also provide an IoT gateway that can communicate with IoT devices supporting various communication protocols, and an operating method of the IoT gateway.

It should be noted that objects of the present disclosure are not limited to the above-described objects, and other objects of the present disclosure will be apparent to those skilled in the art from the following descriptions.

According to an aspect of the present disclosure, an IoT gateway includes: a wide area network (WAN) port monitoring portion configured to monitor whether a cable for wired connection with a router has been inserted into a WAN port; an operating mode determiner configured to determine an operating mode when the cable has not been inserted into the WAN port; a smart device access portion configured to, when a first mode for operating as a server is determined as the operating mode, be activated and connected to a smart device of a user and acquire access information for a target router from the smart device; a router access portion configured to, when the access information for the target router is acquired, be activated and wirelessly access the target router using the access information for the target router; and a service provider configured to, when the router access portion accesses the target router, transfer status messages acquired from one or more IoT devices to the target router, or receive control commands for the one or more IoT devices from the target router and transfer the control commands to the corresponding IoT devices.

Here, when the first mode is determined as the operating mode by the operating mode determiner, the smart device access portion may induce access of the smart device by selecting and assigning any one of accessible Internet protocol (IP) bands to the smart device.

When the first mode is determined as the operating mode by the operating mode determiner, the smart device access portion may scan routers accessible by the IoT gateway and generate and provide a list of the accessible routers to the smart device, and the target router may be any one router selected from among the routers included in the list by the smart device.

Also, the smart device access portion may acquire SSIDs of the accessible routers by scanning the accessible routers, and generate the list by rearranging the SSIDs of the accessible routers in order of received signal strength indication (RSSI) values of the accessible routers.

Also, the smart device access portion may acquire SSIDs of the accessible routers by scanning the accessible routers and generate, when a Korean notation format of the SSIDs of the accessible routers differs from a Korean notation format supported by the smart device, the list by converting the Korean notation format of the SSIDs of the accessible routers into the Korean notation format supported by the smart device.

When a second mode for operating as a client is determined as the operating mode, the router access portion may be additionally activated, acquire access information for a router that the IoT gateway has last accessed from a memory, and wirelessly access the last accessed router using the access information for the last accessed router.

The operating mode determiner may determine the first mode as the operating mode and activate the smart device access portion when the access information for the router that the IoT gateway has last accessed is not recorded in the memory, and may deactivate the smart device access portion and activate the router access portion when the access information for the target router is acquired, and the operating mode determiner may determine the second mode as the operating mode and activate the router access portion when the access information for the router that the IoT gateway has last accessed is recorded in the memory.

In an exemplary embodiment, the access information may include at least one piece of information among an SSID of the target router, an authentication type of the target router, and a password of the target router.

Meanwhile, the service provider may include a plurality of communication modules configured to be connected with the IoT devices by pairing up with the IoT devices.

According to another aspect of the present disclosure, an operating method of an IoT gateway includes: monitoring whether a cable for wired connection with a router has been inserted into a WAN port; determining an operating mode when the cable has not been inserted into the WAN port; causing a smart device of a user to access the IoT gateway by assigning any one of assignable IP bands to the smart device when a first mode for operating as a server is determined as the operating mode; generating and providing a list of accessible routers to the smart device; when access information for a target router selected by the smart device from among the routers included in the list is received from the smart device, wirelessly accessing the target router using the received access information; and transferring status messages of one or more IoT devices to the target router, or receiving control commands for the one or more IoT devices from the target router and transferring the control commands to the corresponding IoT devices.

The providing of the list of accessible routers may include acquiring SSIDs of the accessible routers by scanning the accessible routers, and generating the list by rearranging the SSIDs of the accessible routers in order of RSSI values of the accessible routers.

Also, the providing of the list of accessible routers may include acquiring SSIDs of the accessible routers by scanning the accessible routers, and when a Korean notation format of the SSIDs of the accessible routers differs from a Korean notation format supported by the smart device, generating the list by converting the Korean notation format of the SSIDs of the accessible routers into the Korean notation format supported by the smart device.

Meanwhile, the operating method may further include: when a second mode for operating as a client is determined as the operating mode, acquiring access information for a router that the IoT gateway has last accessed from a memory; and wirelessly accessing the last accessed router using the access information for the last accessed router.

The determining of the operating mode may include determining the first mode as the operating mode when the access information for the router that the IoT gateway has last accessed is not recorded in the memory, and determining the second mode as the operating mode when the access information for the router that the IoT gateway has last accessed is recorded in the memory.

According to the present invention, the IoT gateway also operates in a server mode in which an IP can be actively assigned to a user's smart device, thereby connecting the smart device of the user to the IoT gateway and displaying the access information of the router through the user's smart device It is possible to reduce the size and manufacturing cost of the IoT gateway because no separate input device and display device for inputting or displaying the connection information are required.

In addition, according to the present invention, the IoT gateway transforms the Hangul SSID of the router according to the Hangul notation scheme supported by the user's smart device, and provides the effect that the Hangul SSID can be accurately displayed on the user's smart device.

In addition, according to the present invention, the IoT gateway rearranges the SSID list of the routers sorted in alphabetical order in the order of the RSSI size, thereby enabling the user to easily select a router having a high signal strength among a plurality of routers.

In addition, according to the present invention, since the IoT gateway includes a plurality of communication modules to support various kinds of communication protocols, it is possible to communicate with the IoT devices using various communication protocols, thereby expanding the IoT service range.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION OF THE EMBODIMENTS

The meanings of terms described herein should be understood as follows.

As described herein, expression in the singular should be understood to include a plural meaning, unless clearly defined otherwise in the context. The terms "first," "second," and the like may be used to distinguish one element from another, and the scope of the present disclosure should not be limited by these terms.

The terms "comprise," "include," "have," and the like should be understood to specify the presence of stated features, numbers, steps, operations, elements, parts, or a combination thereof but not to preclude the presence or addition of one or more other features, numbers, steps, operations, elements, parts, or a combination thereof It should be understood that the term "at least one" followed by a list of one or more associated items includes all combinations of the associated items. For example, "at least one of a first item, a second item, and a third item" include all combinations of two or more items selected from the first, second, and third items as well as each of the first, second, and third items.

Hereinafter, exemplary embodiments of the present disclosure will be described in detail with reference to the appended drawings. Throughout the drawings, like reference numbers will be used to refer to like or similar elements, and duplicate descriptions thereof will be omitted. In the following description of the present disclosure, a detailed description of a related known technology will be omitted when determined to obscure the gist of the present disclosure.

The appended drawings are only intended to facilitate understanding of the spirit of the present disclosure and should not be construed as limiting the spirit of the present disclosure. The spirit of the present disclosure should be construed as including all modifications, equivalents, and substitutes as well as the appended drawings.

Figure 1:
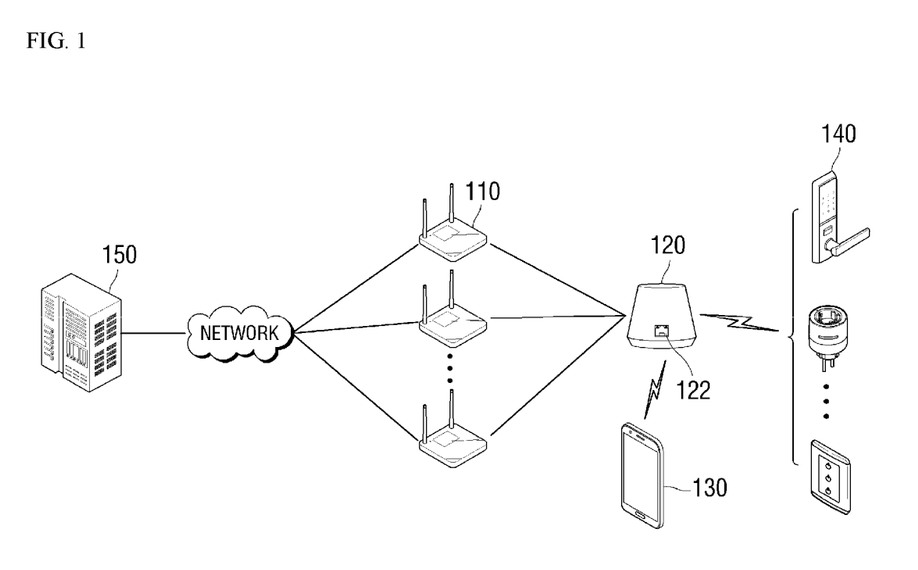
FIG. 1 is a diagram showing a configuration of an Internet of things (IoT) service providing system to which an IoT gateway according to an exemplary embodiment of the present disclosure is applied.

FIG. 1 is a diagram showing a configuration of an Internet of things (IoT) service providing system to which an IoT gateway according to an exemplary embodiment of the present disclosure is applied.

As shown in FIG. 1, an IoT service providing system 100 according to an exemplary embodiment of the present disclosure includes a router 110, an IoT gateway 120, a smart device 130, a plurality of IoT devices 140, and a management server 150.

First, the router 110 connects the management server 150 and the IoT gateway 120. To this end, the router 110 is connected to the management server 150 via a wired network and accesses the IoT gateway 120 via a wired network or a wireless network. Here, the IoT service providing system 100 may include a plurality of routers 110 as shown in FIG. 1 but may include only one router 110.

When a wired network or wireless network access request is received from the IoT gateway 120, the router 110 assigns any one of predetermined Internet protocol (IP) bands to the IoT gateway 120 so that the IoT gateway 120 may access the router 110 through the IP band.

The IoT gateway 120 connects the one or more IoT devices 140 to the management server 150 through the router 110. To this end, the IoT gateway 120 is connected to the router 110 via the wired network or the wireless network. Also, the IoT gateway 120 is paired with the one or more IoT devices 140 and communicates with the one or more IoT devices 140 according to communication methods supported by the IoT devices 140.

A configuration of the IoT gateway 120 according to the present disclosure will be described in detail below with reference to FIG. 2.

Figure 2:
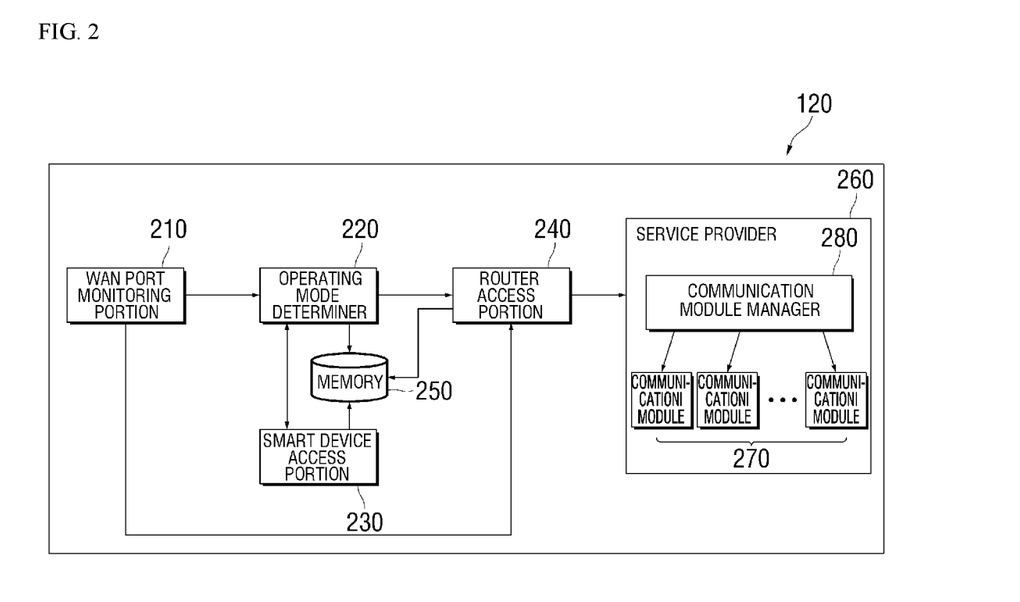
FIG. 2 is a block diagram showing a configuration of the IoT gateway shown in FIG. 1.

FIG. 2 is a block diagram showing a configuration of an IoT gateway according to an exemplary embodiment of the present disclosure.

As shown in FIG. 2, the IoT gateway 120 according to an exemplary embodiment of the present disclosure includes a wide area network (WAN) port monitoring portion 210, an operating mode determiner 220, a smart device access portion 230, a router access portion 240, a memory 250, and a service provider 260.

The WAN port monitoring portion 210 monitors whether a cable (not shown) for wired connection with a router 110 has been inserted into a WAN port (122 of FIG. 1). The WAN port monitoring portion 210 transfers a monitoring result to the operating mode determiner 220.

When a monitoring result indicating whether the cable has been inserted into the WAN port is received from the WAN port monitoring portion 210, the operating mode determiner 220 determines an operating mode of the IoT gateway 120.

First, when a monitoring result indicating that the cable has been inserted into the WAN port is received from the WAN port monitoring portion 210, the operating mode determiner 220 activates and causes the router access portion 240 to be assigned an IP band by a router 110 so that the router access portion 240 may access the router 110 via the wired network using the assigned IP band.

On the other hand, when a monitoring result indicating that the cable has not been inserted into the WAN port is received from the WAN port monitoring portion 210, the operating mode determiner 220 determines any one of a first mode and a second mode as the operating mode of the IoT gateway 120. In an exemplary embodiment, the first mode denotes a mode in which the IoT gateway 120 can operate as a server, and the second mode denotes a mode in which the IoT gateway 120 can operate as a client.

The IoT gateway 120 that operates in the first mode for operating as a server can assign an IP band to the smart device 130 of a user. The IoT gateway 120 that operates in the second mode for operating as a client can be assigned an IP band by a router 110.

According to this exemplary embodiment, when the first mode is determined as the operating mode of the IoT gateway 120, the operating mode determiner 220 activates the smart device access portion 230 in order to cause the IoT gateway 120 to operate as a server. On the other hand, when the second mode is determined as the operating mode of the IoT gateway 120, the operating mode determiner 220 activates the router access portion 240 in order to cause the IoT gateway 120 to operate as a client.

In an exemplary embodiment, the operating mode determiner 220 searches the memory 250 and determines the first mode as the operating mode of the IoT gateway 120 when access information for a router 110 that the IoT gateway 120 has last accessed is not recorded in the memory 250. On the other hand, the operating mode determiner 220 searches the memory 250 and determines the second mode as the operating mode of the IoT gateway 120 when the access information for the router 110 that the IoT gateway 120 has last accessed is recorded in the memory 250.

The smart device access portion 230 is activated and accesses the smart device 130 of the user when the first mode is determined as the operating mode by the operating mode determiner 220. To this end, the smart device access portion 230 selects any one of assignable IP bands stored in the memory 250 and assigns the selected IP band to the smart device 130. Using the IP band assigned to the smart device 130, the smart device 130 of the user accesses the smart device access portion 230.

When the smart device 130 of the user accesses the smart device access portion 230, the smart device access portion 230 provides a list of accessible routers to the smart device 130 of the user, and receives access information for any one router (referred to as a target router below) selected by the user from among routers included in the list of accessible routers from the smart device 130. Here, the target router may be the router 110 shown in FIG. 1 or may differ from the router 110 shown in FIG. 1. For convenience of description, it is assumed below that the target router is the router 110 shown in FIG. 1, and the target router will be indicated by the reference number "110."

The reason that the IoT gateway 120 according to the present disclosure receives the access information for the target router 110 from the smart device 130 through the smart device access portion 230, is because the IoT gateway 120 according to the present disclosure has no input device or display device and it is not possible to input the access information for the target router 110 through the IoT gateway 120.

Accordingly, the IoT gateway 120 according to the present disclosure can display or input the access information for the target router 110 using the smart device 130 of the user connected to the IoT gateway 120. Consequently, an additional input device or display device for inputting or displaying the access information for the target router 110 is not required such that the size and the manufacturing cost of the IoT gateway 120 can be reduced.

Here, the access information for the target router 110 may include at least one piece of information among a service set identification (SSID) of the target router 110, an authentication type of the target router 110, and a password of the target router 110.

Meanwhile, when the first mode is determined as the operating mode by the operating mode determiner 220, the smart device access portion 230 acquires SSIDs of routers that can be accessed by the IoT gateway 120 by scanning routers around the IoT gateway 120. When the SSIDs of the accessible routers are acquired, the smart device access portion 230 generates a list of accessible routers using the acquired SSIDs of the routers. In an exemplary embodiment, the smart device access portion 230 may generate a list of accessible routers by arranging SSIDs of routers in alphabetical order.

In another exemplary embodiment, the smart device access portion 230 may generate a list of accessible routers by measuring received signal strength indications (RSSIs) of accessible routers and rearranging SSIDs of the routers in decreasing order of measured RSSI value.

In this way, since the IoT gateway 120 according to the present disclosure can rearrange SSIDs of routers in order of RSSI values of the routers and provide a list of accessible routers, a user can easily select a router having an excellent signal strength from among a plurality of routers.

Meanwhile, when an acquired SSID of a router is in Korean, the smart device access portion 230 may determine whether a Korean notation format of the acquired SSID of the router is the same as a Korean notation format supported by the smart device 130. When the Korean notation formats are not the same, the smart device access portion 230 may convert the acquired Korean SSID of the router into the Korean notation format supported by the smart device 130 and generate a list of accessible routers using the converted Korean SSID of the router.

For example, when a Korean SSID of a router acquired by the smart device access portion 230 is written in Extended Unix Code-Korean (EUC-KR) and the smart device 130 supports a Korean notation format of Unicode Transformation Format-8 (UTF-8), the smart device access portion 230 converts the acquired Korean SSID of the router into UTF-8 format and generate a list of accessible routers using the converted Korean SSID.

In this way, since the IoT gateway 120 converts a Korean SSID of a router into a Korean notation format supported by the smart device 130 of the user and provides the converted Korean SSID, the present disclosure can cause the Korean SSID to be accurately displayed in the smart device 130 of the user without an error.

Meanwhile, when the access information for the target router 110 is acquired from the smart device 130, the smart device access portion 230 notifies the operating mode determiner 220 that the access information for the target router 110 has been acquired. Accordingly, the operating mode determiner 220 deactivates the smart device access portion 230 and activates the router access portion 240.

When the access information for the target router 110 is acquired by the smart device access portion 230, the router access portion 240 is activated by the operating mode determiner 220. The router access portion 240 transmits an access request for the target router 110 by transmitting the access information for the target router 110 received by the smart device access portion 230 to the target router 110. Accordingly, an IP band is assigned by the target router 110, and the router access portion 240 accesses the target router 110 in a wireless fidelity (WiFi) manner using the assigned IP band.

Also, when the second mode is determined as the operating mode of the IoT gateway 120 by the operating mode determiner 220, the router access portion 240 according to the present disclosure is activated by the operating mode determiner 220. In this case, since the router access portion 240 operates as a client, the router access portion 240 acquires access information for a router that the IoT gateway 120 has last accessed from the memory 250, and transmits an access request for the last accessed router by transmitting the access information for the last accessed router to the router. Accordingly, an IP band is assigned by the router, and the router access portion 240 accesses the router in the WiFi manner using the assigned IP band.

Here, the router that the IoT gateway 120 has last accessed may be the above-described target router 110 or may be a router other than the target router 110. For convenience of description, the router that the IoT gateway 120 has last accessed will be referred to as the target router 110 below.

In the memory 250, the list of accessible routers generated by the smart device access portion 230 is recorded. Also, in the memory 250, the access information for the target router 110 acquired from the smart device 130 by the smart device access portion 230 is recorded. Further, when the IoT gateway 120 accesses a new target router 110 using access information for the new target router 110 acquired from the smart device 130, the memory 250 updates the previously acquired access information for the target router 110 with the access information for the new target router 110. Accordingly, the access information for the new target router 110 becomes access information for a router that the IoT gateway 120 has last accessed.

In addition, in the memory 250, information on a plurality of IP bands that can be assigned to the smart device 130 by the smart device access portion 230 is stored.

When the IoT gateway 120 and the target router 110 are connected, the service provider 260 transfers status messages of the one or more IoT devices 140 acquired from the IoT devices 140 to the target router 110. Also, the service provider 260 receives control commands for one or more IoT devices 140 from the target router 110 and transfers the control commands to the corresponding IoT devices 140.

To this end, the service provider 260 according to the present disclosure includes one or more communication modules 270 for communicating with the one or more IoT devices 140 and a communication module manager 280 for controlling the individual communication modules 270.

First, the communication modules 270 are paired with the IoT devices 140 and receive status messages of the IoT devices 140 from the IoT devices 140. The communication modules 270 transfer the received status messages to the communication module manager 280.

Also, each of the communication modules 270 transfers a control command received through the communication module manager 280 to the corresponding IoT device 140.

In an exemplary embodiment, the communication modules 270 may support different communication protocols according to communication methods of the IoT devices 140. For example, each of the communication modules 270 can support one of communication protocols such as Zigbee, Z-Wave, Bluetooth, beacon, WiFi, Bluetooth low energy (BLE), and the like.

The communication module manager 280 pairs the communication modules 270 and the IoT devices 140 together. Specifically, the communication module manager 280 according to the present disclosure pairs the IoT devices 140 with communication modules 270 that can communicate with the IoT devices 140.

For pairing between the IoT devices 140 and the communication modules 270, the communication module manager 280 sets each of the communication modules 270 to a pairing mode when the IoT gateway 120 is connected to the target router 110. Subsequently, when the IoT devices 140 are set to the pairing mode by a user, the communication module manager 280 pairs the corresponding communication modules 270 with the IoT devices 140. In an exemplary embodiment, the communication module manager 280 may set the communication modules 270 to the pairing mode when a pairing command is received from the smart device 130 of the user through the target router 110.

Meanwhile, when status messages of the IoT devices 140 are received from the communication modules 270, the communication module manager 280 converts the status message into a data format that can be processed by the management server 150 and transfers the converted status messages to the management server 150 through the target router 110. In an exemplary embodiment, the communication module manager 280 may convert a status message received from each of the communication modules 270 into hypertext transfer protocols (HTTPS)+JavaScript Object Notation (JSON) format and transfer the converted status message to the management server 150.

Also, when a control command for an IoT device 140 is received from the management server 150 through the target router 110, the communication module manager 280 selects a communication module 270 to which the control command will be transferred from among the plurality of communication modules 270. Further, the communication module manager 280 converts the received control command into a format that can be processed by the communication module 270 and transfers the converted control command to the communication module 270.

For example, the communication module manager 280 determines the communication module 270 to which the control command will be transferred, and a communication protocol supported by the communication module 270 by parsing the received control command, converts the received control command into a communication protocol format supported by the communication module 270, and transfers the converted control command to the communication module 270.

Referring back to FIG. 1, when the IoT gateway 120 operates in the first mode, the smart device 130 of the user accesses the IoT gateway 120 using an IP band assigned by the IoT gateway 120. An application for accessing the IoT gateway 120 is installed in the smart device 130 of the user. In an exemplary embodiment, the application installed in the smart device 130 of the user is written based on the Alljoyn protocol.

When the smart device 130 of the user accesses the IoT gateway 120 operating in the first mode, the smart device 130 receives a list of accessible routers from the IoT gateway 120 through the installed application and displays the received list of routers.

Also, when any one of the routers included in the router list is selected as a target router through the installed application, the smart device 130 of the user requires the user to input a password for accessing the target router. The smart device 130 of the user generates access information including at least one piece of information among an SSID of the target router, an authentication type of the target router, and the password of the target router and transfers the access information to the IoT gateway 120.

Meanwhile, when it is determined that the IoT gateway 120 has accessed the target router 110, the smart device 130 of the user generates a pairing command for pairing between the IoT devices 140 and the IoT gateway 120 through an application installed in the smart device 130 and transfers the pairing command to the IoT gateway 120. To this end, the smart device 130 of the user directly accesses the target router 110 using the installed application and transfers the pairing command to the IoT gateway 120 through the target router 110.

Also, the smart device 130 of the user generates control commands for the IoT devices 140 through the installed application and transfers the generated control commands to the management server 150. The smart device 130 of the user receives status messages of the IoT devices 140 from the management server 150 and provides the received status messages to the user.

In other words, control commands generated through the smart device 130 of the user are transferred to the IoT gateway 120 through the management server 150 and the router 110, and status messages of the IoT devices 140 collected by the IoT gateway 120 are provided to the smart device 130 of the user through the router 110 and the management server 150.

In an exemplary embodiment, the smart device 130 can be implemented as a smart watch, a smart phone, a tablet personal computer (PC), or the like.

The IoT devices 140 operate according to control commands transferred from the IoT gateway 120, generate status messages thereof, and periodically transmit the status messages to the IoT gateway 120. To this end, communication modules (not shown) for communication with the IoT gateway 120 are installed in the IoT devices 140 and paired with communication modules 270 of the IoT gateway 120.

The IoT devices 140 may be a door lock, an IoT switch, an IoT sensor, a closed circuit television (CCTV), a gas valve, a lighting controller, an IoT plug, a TV, a refrigerator, an audio system, and the like.

The management server 150 receives status data of the IoT devices 140 transmitted from the IoT gateway 120 through the router 110 and directly processes the status data or provides the status data to the smart device 130 of the user. Also, when control commands for the IoT devices 140 are received from the smart device 130 of the user, the management server 150 transfers the control commands to the IoT gateway 120 through the router 110.

An operating method of an IoT gateway according to the present disclosure will be described below with reference to FIG. 3.

Figure 3:
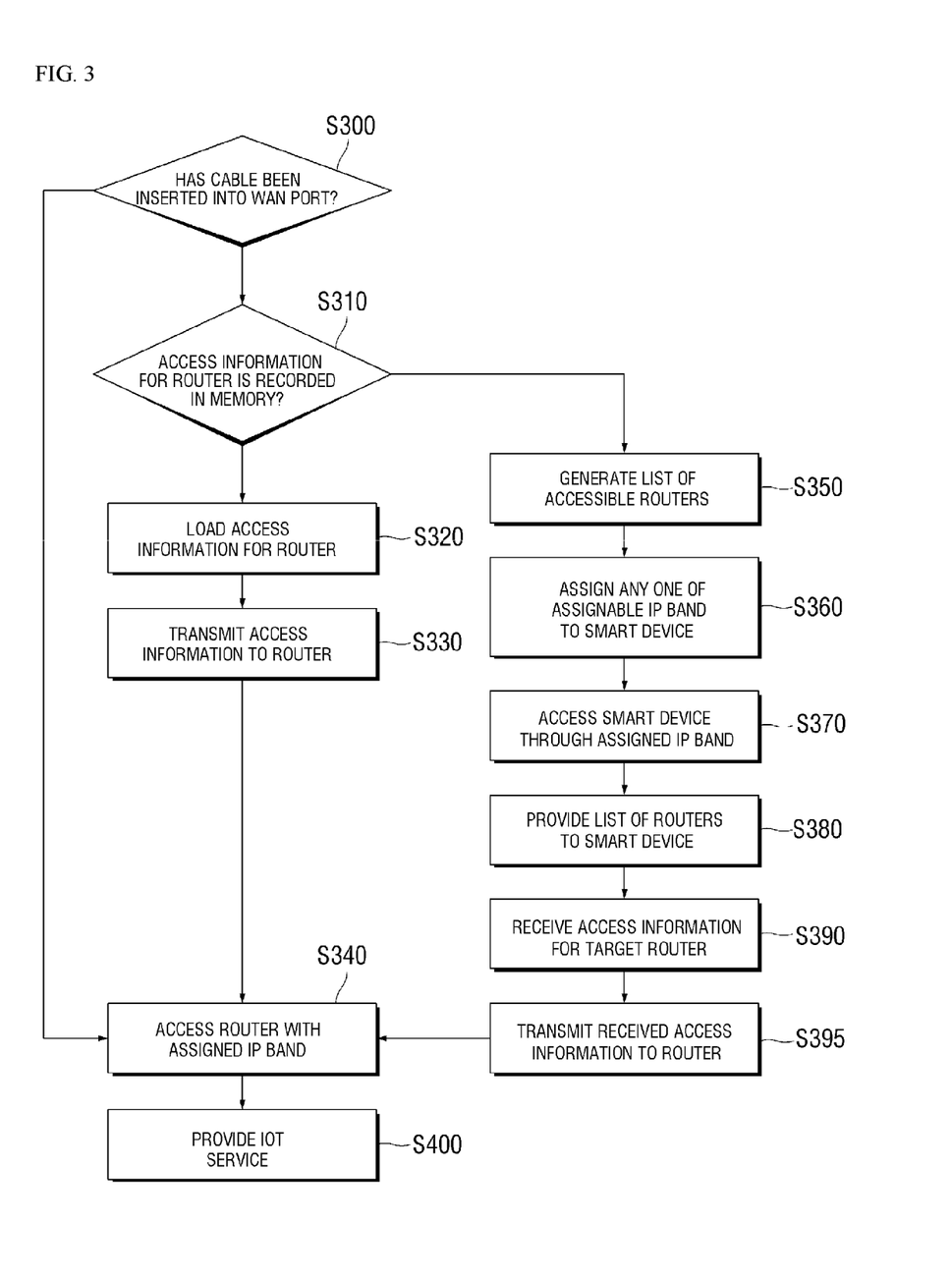
FIG. 3 is a flowchart showing an access method between an IoT gateway and a router according to an exemplary embodiment of the present disclosure.

FIG. 3 is a flowchart showing an operating method of an IoT gateway according to an exemplary embodiment of the present disclosure. The operating method of an IoT gateway illustrated in FIG. 3 can be performed by the IoT gateway shown in FIGS. 1 and 2.

Initially, as shown in FIG. 3, an IoT gateway monitors whether a cable for wired connection with a router has been inserted into a WAN port (S300).

When it is determined that the cable has not been inserted into the WAN port as a monitoring result, the IoT gateway determines whether access information for a router that the IoT gateway has last accessed is recorded in a memory (S310).

When it is determined that the access information for the router that the IoT gateway has last accessed is recorded in the memory, the IoT gateway loads the access information for the router recorded in the memory by operating in the second mode as a client (S320).

The IoT gateway transmits the access information loaded in S320 to the router (S330), and is assigned an IP band by the router and accesses the router (S340).

Meanwhile, when it is determined in S310 that the access information for the router that the IoT gateway has last accessed is not recorded in the memory, the IoT gateway scans accessible routers and generates a list of accessible routers by operating in the first mode as a server (S350).

In an exemplary embodiment, the IoT gateway may acquire SSIDs of accessible routers by scanning the accessible routers, and generate a list of the routers by arranging the acquired SSIDs of the routers in alphabetical order.

In another exemplary embodiment, the IoT gateway may measure RSSIs of accessible routers and generate a list of the accessible routers by rearranging SSIDs of the routers in decreasing order of measured RSSI value.

As described above, an IoT gateway according to the present invention can rearrange SSIDs of routers in order of RSSI values of the routers and provide a list of accessible routers such that a user can easily select a router having an excellent signal strength from among a plurality of routers.

Meanwhile, when an acquired SSID of a router is in Korean, an IoT gateway according to the present disclosure may determine whether a Korean notation format of the acquired SSID of the router is the same as a Korean notation format supported by a smart device. When the Korean notation formats are not the same, the IoT gateway according to the present disclosure may convert the acquired Korean SSID of the router into the Korean notation format supported by the smart device and generate a list of accessible routers using the converted Korean SSID of the router.

For example, when a Korean SSID of a router acquired by the IoT gateway is written in EUC-KR and the smart device supports a Korean notation format of UTF-8, the IoT gateway converts the acquired Korean SSID of the router into UTF-8 format and generates a list of accessible routers using the converted Korean SSID.

In this way, since an IoT gateway converts a Korean SSID of a router into a Korean notation format supported by a smart device of a user and provides the converted Korean SSID, the present disclosure can cause the Korean SSID to be accurately displayed in the smart device of the user without an error.

After S350, the IoT gateway selects any one IP band from among assignable IP bands stored in the memory and assigns the selected IP band to the smart device (S360).

Subsequently, when the smart device and the IoT gateway are connected through the assigned IP band (S370), the IoT gateway provides the list of routers generated in S350 to the smart device (S380).

Subsequently, the IoT gateway receives access information for any one router (referred to as a target router below) selected by the user from among routers included in the list of accessible routers from the smart device (S390). Here, the target router may be the router 110 shown in FIG. 1 or may differ from the router 110 shown in FIG. 1. For convenience of description, it is assumed below that the target router is the router 110 shown in FIG. 1, and the target router will be indicated by the reference number "110."

Here, the access information for the target router may include at least one piece of information among an SSID of the target router, an authentication type of the target router, and a password of the target router.

The reason that the IoT gateway according to the present disclosure receives the access information for the target router from the smart device by operating in the second mode is because the IoT gateway according to the present disclosure has no input device or display device and it is not possible to input the access information for the target router through the IoT gateway.

Accordingly, the IoT gateway according to the present disclosure can display or input the access information for the target router using the smart device of the user connected to the IoT gateway. Consequently, an additional input device or display device for inputting or displaying the access information for the target router is not required such that the size and the manufacturing cost of the IoT gateway can be reduced.

Subsequently, the IoT gateway transmits the access information received in S390 to the router (S395), and is assigned an IP band by the router and accesses the router (S340).

Meanwhile, when it is determined in S300 that the cable has been inserted into the WAN port as a monitoring result, the IoT gateway is assigned an IP band by a router and accesses the router (S340).

Subsequently, the IoT gateway provides an IoT service between one or more IoT devices and the smart device (S405).

Figure 4:
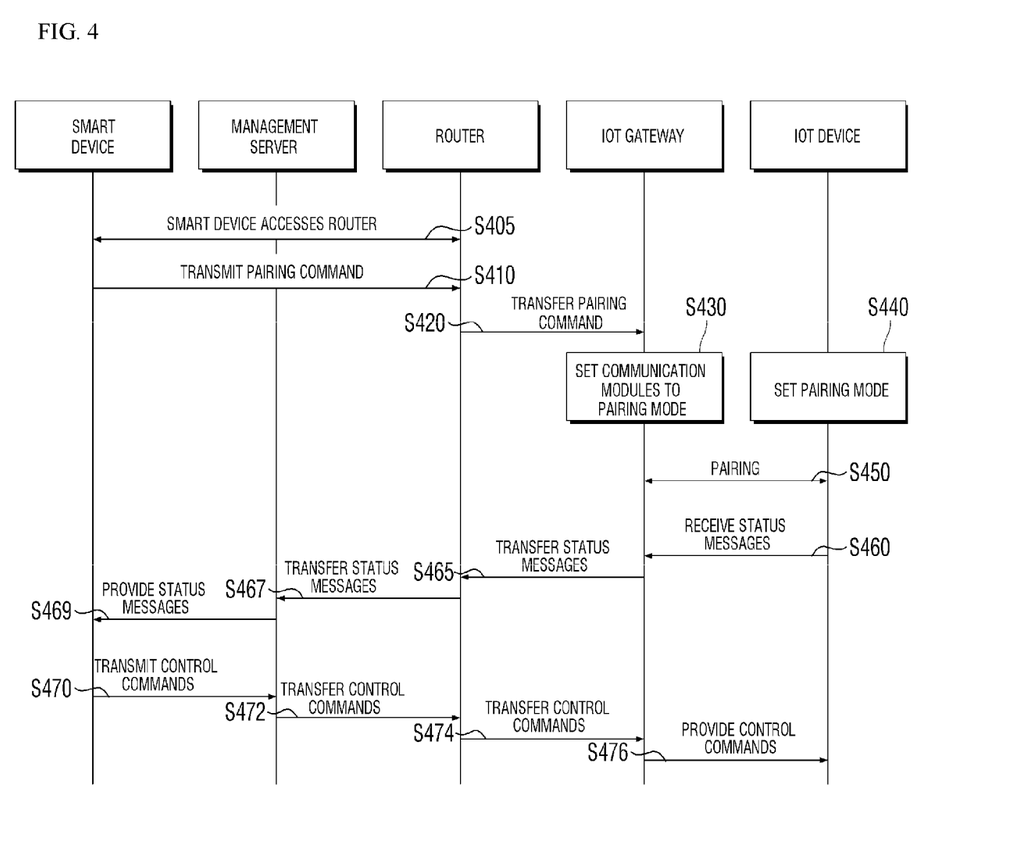
FIG. 4 is a sequence diagram showing a method of providing an IoT service according to an exemplary embodiment of the present disclosure.

A method of providing an IoT service according to the present disclosure will be described below with reference to FIG. 4. FIG. 4 is a sequence diagram showing a method of providing an IoT service according to an exemplary embodiment of the present disclosure. To provide an IoT service as shown in FIG. 4, an IoT gateway is required to access a router via a wired network or a wireless network.

As shown in FIG. 4, a smart device of a user accesses a router (S405). Subsequently, the smart device of the user transmits a pairing command for an IoT gateway to the router (S410). Then, the router transfers the pairing command to the IoT gateway (S420).

Subsequently, the IoT gateway sets communication modules for communication with IoT devices that are pairing targets to the pairing mode according to the pairing command (S430). In an exemplary embodiment, the communication modules may support different communication protocols according to communication methods of the IoT devices. For example, each of the communication modules can support one of communication protocols such as Zigbee, Z-Wave, Bluetooth, beacon, WiFi, BLE, and the like.

When the IoT devices that are pairing targets are set to the pairing mode (S440), the IoT gateway pairs the IoT devices set to the pairing mode with the corresponding communication modules (S450).

Subsequently, the IoT gateway periodically receives status messages from the paired IoT devices (S460).

The IoT gateway transfers the status messages received in 5460 to the router (S465). The router transfers the received status messages to a management server (S467), and the management server provides the received status messages to the smart device of the user (S469). In an exemplary embodiment, the IoT gateway may convert the status messages of the IoT devices received from the IoT devices into a format that can be processed by the management server and transfer the converted status messages to the management server. For example, the IoT gateway may convert a status message received from an IoT device into HTTPS+JSON format and transfer the converted status message to the management server.

Meanwhile, when the smart device transmits control commands for the IoT devices to the management server (S470), the management server transfers the received control commands to the router (S472). The router transfers the control commands to the IoT gateway (S474), and the IoT gateway provides the control commands to the corresponding IoT devices (S476). To this end, when a control command for an IoT device is received from the router, the IoT gateway selects a communication module to which the control command will be transferred from among the plurality of communication modules included in the IoT gateway first, converts the received control command into a format that can be processed by the selected communication module, and then transfers the converted control commands to the communication module.

For example, the IoT gateway determines the communication module to which the control command will be transferred and a communication protocol supported by the communication module by parsing the received control command, converts the received control command into a communication protocol format supported by the communication module, and transfers the converted control command to the communication module.

The operating method of an IoT gateway and the method of providing an IoT service described above may be implemented in the form of a program that can be executed using various computing means. The program for executing the operating method of an IoT gateway and the method of providing an IoT service is stored in a computer-readable recording medium such as a hard disk, a compact disk read-only memory (CD-ROM), a digital versatile disk (DVD), a ROM, a random access memory (RAM), or a flash memory.

According to exemplary embodiments of the present disclosure, an IoT gateway operates in a server mode in which it is possible to actively assign an IP band to a smart device of a user, thereby causing the smart device of the user to access the IoT gateway and displaying or inputting access information for a router through the smart device of the user. Therefore, an additional input device or display device for inputting or displaying access information is not required such that the size and the manufacturing cost of the IoT gateway can be reduced.

According to exemplary embodiments of the present disclosure, since an IoT gateway converts a Korean SSID of a router into a Korean notation format supported by a smart device of a user and provides the converted Korean SSID, the smart device of the user can accurately display the Korean SSID.

According to exemplary embodiments of the present disclosure, an IoT gateway rearranges an SSID list of routers arranged in alphabetical order in order of RSSI values and provides the rearranged SSID list such that a user can easily select a router having an excellent signal strength from among a plurality of routers.

According to exemplary embodiments of the present disclosure, an IoT gateway includes a plurality of communication modules to support various communication protocols, and thus can communicate with IoT devices that use various communication protocols. For this reason, it is possible to expand an IoT service range.

Those of ordinary skill in the art to which the present disclosure pertains will appreciate that the above-described present disclosure can be implemented in other forms without changing the technical spirit or essential features thereof. Therefore, the above-described exemplary embodiments should be construed as exemplary rather than limiting in all aspects. The scope of the present disclosure is defined by the following claims rather than by the foregoing detailed description. It should be understood that all alterations and modifications derived from the meaning and scope of the claims and their equivalents are included in the scope of the present disclosure.

What is claimed is:

1. An Internet of things (IoT) gateway comprising:
   a wide area network (WAN) port monitoring portion configured to monitor whether a cable for wired connection with a router has been inserted into a WAN port;
   an operating mode determiner configured to determine an operating mode when the cable has not been inserted into the WAN port;
   a smart device access portion configured to, when a first mode for operating as a server is determined as the operating mode, be activated and connected to a smart device of a user and acquire access information for a target router from the smart device;
   a router access portion configured to, when the access information for the target router is acquired, be activated and wirelessly access the target router using the access information for the target router; and
   a service provider configured to, when the router access portion accesses the target router, transfer status messages acquired from one or more IoT devices to the target router, or receive control commands for the one or more IoT devices from the target router and transfer the control commands to the corresponding IoT devices, and
   wherein the operating mode determiner determines the first mode as the operating mode and activates the smart device access portion when the access information for the router that the IoT gateway has last accessed is not recorded in the memory, and deactivates the smart device access portion and activates the router access portion when the access information for the target router is acquired, and
   the operating mode determiner determines a second mode as the operating mode and activates the router access portion when the access information for the router that the IoT gateway has last accessed is recorded in the memory.

2. The IoT gateway of claim 1, wherein when the first mode is determined as the operating mode by the operating mode determiner, the smart device access portion induces access of the smart device by selecting and assigning any one of accessible Internet protocol (IP) bands to the smart device.

3. The IoT gateway of claim 1, wherein when the first mode is determined as the operating mode by the operating mode determiner, the smart device access portion scans routers accessible by the IoT gateway, and generates and provides a list of the accessible routers to the smart device, and the target router is any one router selected by the smart device from among the routers included in the list.

4. The IoT gateway of claim 3, wherein the smart device access portion acquires service set identifications (SSIDs) of the accessible routers by scanning the accessible routers, and generates the list by rearranging the SSIDs of the accessible routers in order of received signal strength indication (RSSI) values of the accessible routers.

5. The IoT gateway of claim 3, wherein the smart device access portion acquires service set identifications (SSIDs) of the accessible routers by scanning the accessible routers and generates, when a Korean notation format of the SSIDs of the accessible routers differs from a Korean notation format supported by the smart device, the list by converting the Korean notation format of the SSIDs of the accessible routers into the Korean notation format supported by the smart device.

6. The IoT gateway of claim 1, wherein when the second mode for operating as a client is determined as the operating mode, the router access portion is additionally activated, acquires access information for a router that the IoT gateway has last accessed from a memory, and wirelessly accesses the last accessed router using the access information for the last accessed router.

7. The IoT gateway of claim 1, wherein the access information includes at least one piece of information among a service set identification (SSID) of the target router, an authentication type of the target router, and a password of the target router.

8. The IoT gateway of claim 1, wherein the service provider includes a plurality of IoT device communication modules configured to be connected with the IoT devices by pairing up with the IoT devices.

9. An operating method of an Internet of things (IoT) gateway, the method comprising:

monitoring whether a cable for wired connection with a router has been inserted into a wide area network (WAN) port;

determining an operating mode when the cable has not been inserted into the WAN port;

causing a smart device of a user to access the IoT gateway by assigning any one of assignable IP bands to the smart device when a first mode for operating as a server is determined as the operating mode;

generating and providing a list of accessible routers to the smart device;

when access information for a target router selected by the smart device from among the routers included in the list is received from the smart device, wirelessly accessing the target router using the received access information; and transferring status messages of one or more IoT devices to the target router, or receiving control commands for the one or more IoT devices from the target router and transferring the control commands to the corresponding IoT devices, and wherein the determining of the operating mode comprises determining the first mode as the operating mode when the access information for the router that the IoT gateway has last accessed is not recorded in the memory, and determining a second mode as the operating mode when the access information for the router that the IoT gateway has last accessed is recorded in the memory.

10. The operating method of claim 9, wherein the providing of the list of accessible routers comprises acquiring service set identifications (SSIDs) of the accessible routers by scanning the accessible routers, and generating the list by rearranging the SSIDs of the accessible routers in order of received signal strength indication (RSSI) values of the accessible routers.

11. The operating method of claim 9, wherein the providing of the list of accessible routers comprises acquiring service set identifications (SSIDs) of the accessible routers by scanning the accessible routers, and when a Korean notation format of the SSIDs of the accessible routers differs from a Korean notation format supported by the smart device, generating the list by converting the Korean notation format of the SSIDs of the accessible routers into the Korean notation format supported by the smart device.

12. The operating method of claim 9, further comprising:
when the second mode for operating as a client is determined as the operating mode, acquiring access information for a router that the IoT gateway has last accessed from a memory; and
wirelessly accessing the last accessed router using the access information for the last accessed router.

13. The operating method of claim 9, wherein the access information includes at least one piece of information among a service set identification (SSID) of the target router, an authentication type of the target router, and a password of the target router.

* * * * *